United States Patent [19]

Kosugi et al.

[11] Patent Number: 4,643,393
[45] Date of Patent: Feb. 17, 1987

[54] ELECTROMAGNETIC VALVE

[75] Inventors: Seiji Kosugi; Tadao Suzuki, both of Soka, Japan

[73] Assignee: Shoketsu Kinzoku Kogyo Kabushiki Kaisha, Tokyo, Japan

[21] Appl. No.: 786,756

[22] Filed: Oct. 11, 1985

[30] Foreign Application Priority Data

Mar. 13, 1985 [JP] Japan .................................. 60-35684
Jun. 10, 1985 [JP] Japan .................................. 60-87178

[51] Int. Cl.⁴ ............................................. F16K 31/06
[52] U.S. Cl. .......................... 251/129.01; 251/129.15; 251/129.03; 335/260
[58] Field of Search ...................... 251/129.01, 129.15, 251/129.03; 335/260

[56] References Cited

U.S. PATENT DOCUMENTS

| | | | |
|---|---|---|---|
| 3,757,263 | 9/1973 | Saarem et al. | 251/129.15 X |
| 3,921,670 | 11/1975 | Clippard et al. | 251/129.15 X |
| 3,952,774 | 4/1976 | Loveless | 251/129.15 X |
| 4,423,841 | 1/1984 | Palma | 251/129.15 X |
| 4,552,179 | 11/1985 | Tarusawa et al. | 251/129.15 X |
| 4,561,632 | 12/1985 | Hugler | 251/129.15 |

Primary Examiner—Arnold Rosenthal
Attorney, Agent, or Firm—Oblon, Fisher, Spivak, McClelland, & Maier

[57] ABSTRACT

There is described a ultra-miniature electromagnetic valve assembly smaller than 1 mm in diameter of inlet and outlet ports and having a valve casing of approximately of 10 mm in plan view side length, the valve assembly of the type formed by connecting separately fabricated valve casing and electromagnetic operating section and comprising: an inlet port and an outlet port provided on one side surface of the valve casing; locking projections provided on the opposite side surfaces of said valve casing; and an outer shell member for the electromagnetic operating section, having a notched portion at the inner end of one of side surfaces thereof to evade the inlet and outlet ports and provided with locking windows on the opposite sides of the notched portion and on the other side surface, the locking windows being engageable with the locking projections on the valve casing to connect the electro-magnetic section thereto. Consequently, the valve casing and electromagnetic operating section are connected to each other easily in a space-saving manner, permitting production of ultra-miniature electromagnetic valves.

8 Claims, 9 Drawing Figures

ELECTROMAGNETIC VALVE

BACKGROUND OF THE INVENTION

1. Field of the Invention

This invention relates to an electromagnetic valve to be used on an industrial machine utilizing fluid pressure or vacuum pressure, and more particularly to a ultra-miniature electromagnetic valve with an inlet and outlet ports smaller than 1 mm in diameter and a valve casing of about 10 mm×10 mm in a cross-sectional area thereof.

2. Description of the Prior Art

In the field of electromagnetic valves, it has been known to connect a valve casing and an electromagnetic operating section by bolts, screws or the like. With conventional electromagnetic valves, however, the bolt threading job is troublesome, and bolt-mounting spaces have to be provided on the valve section and electromagnetic operating section, being an obstacle to reductions of the electromagnetic valve size. Accordingly it has been difficult to fabricate a ultra-small electromagnetic valve with inlet and outlet ports of smaller than 1 mm in diameter and a valve casing of about 10 mm×10 mm in a cross-sectional area thereof. The reduction in size of the electromagnetic valve has been more difficult in a case where a manual operating mechanism is provided on the valve casing for use at the time of power supply suspension or other troubles.

SUMMARY OF THE INVENTION

With the foregoing problems in view, the present invention has as its primary object the provision of a ultra-miniature electromagnetic valve in which a valve casing and an electromagnetic operating section are coupled by means of locking projections and locking windows provided on the valve casing and an outer shell member of the electromagnetic operating section, respectively, permitting to join them in a simplified manner and to diminish a space for the joint by unnecessitating a screw or similar connecting members to realize a significant reduction in size of the electromagnetic valve.

It is another object of the invention to provide an electromagnetic valve which can be reduced in size even when a manual operating mechanism is provided on the valve for use on the occasion of power supply suspension or other accidents.

According to the present invention, the above-mentioned primary object is achieved by the provision of an electromagnetic valve assembly of the type formed by joining separately fabricated valve casing and electromagnetic operating section into an integral assembly, the electromagnetic valve assembly including: inlet and outlet ports provided on one side surface of the valve body casing; a pair of locking projections provided on each one of the opposite side surfaces of the valve casing; an outer shell member for the electromagnetic section, having a notched portion on one side surface thereof to evade the inlet and outlet ports on the valve casing and provided with a pair of locking windows on the side surface and the other side surface thereof, the locking windows being engageable with the locking projections to connect the electromagnetic section rigidly to the valve casing.

With the above-described construction according to the present invention, the electromagnetic operating section with the outer shell member is pressed against the valve casing. By so doing, the outer shell portions around the locking windows on the opposite sides of the notched portion are deformed easily by elastic deformation to urge the locking windows into fitting engagement with the locking projections on the valve casing. This not only facilitates the connection of the electromagnetic operating section to the valve casing but also obviates the use of connecting means such as bolts and screws, omitting unnecessary joint spaces to permit a significant reduction of size of the electromagnetic valve. Additionally, the impact resulting from the attraction of the movable iron core to the stator core can be absorbed by taking advantage of the elasticity of the magnetic frame.

The outer shell member is notched in such a manner as to evade the ports on the valve casing, so that there is an advantage that the ports can be used without troubles in piping work although the locking portions are located on the opposite sides of ports on the valve casing for reduction of size.

In addition, even in a case where a manual operating means is provided on the valve casing of the electromagnetic valve assembly for use at the time of power supply suspension or other accidents, it can be handled without troubles by providing another notched portion on the other side of the outer shell member in such a manner as to evade the manual operating means when connected to the valve casing.

The above and other objects, features and advantages of the invention will become apparent from the following description and the appended claims, taken in conjunction with the accompanying drawings which show by way of example preferred embodiments of the invention. Needless to say, the present invention is not restricted to the particular embodiments shown, unless encompassed by the sphere of the appended claims.

Figure 1:
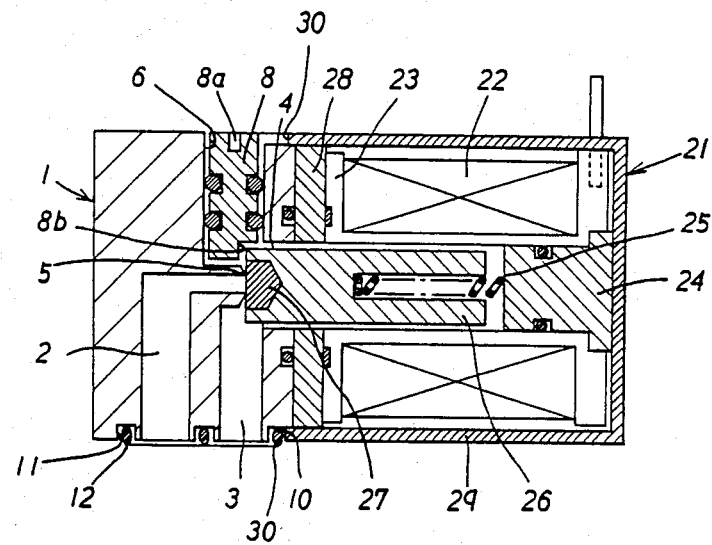
FIG. 1 is a longitudinal section of an electromagnetic valve embodying the present invention.
Figure 2:
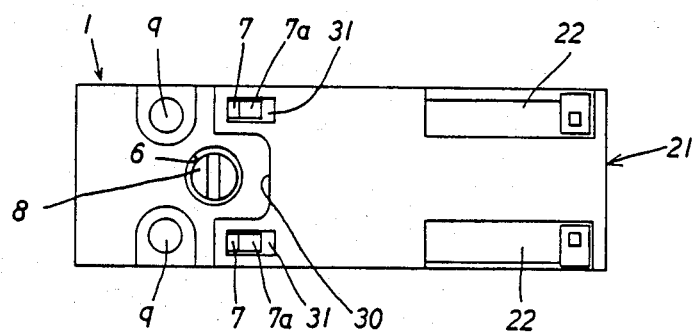
FIG. 2 is a top view of the valve of FIG. 1.
Figure 3:
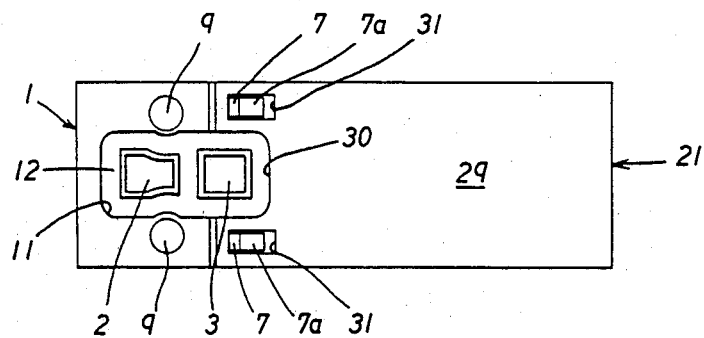
FIG. 3 is a back view of the same valve.

DESCRIPTION OF PREFERRED EMBODIMENTS:

Referring to FIGS. 1 to 3, indicated at 1 and 21 are a valve casing and an electromagnetic operating member which are separately fabricated and separably joined to each other by a locking mechanism which will be described hereinlater.

Figure 4:
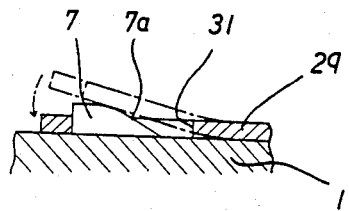
FIG. 4 is an enlarged fragmentary sectional view of a locking mechanism according to the invention.

The valve casing 1 is provided with an inlet port 2 and an outlet port 3 on one side surface, and has a valve chamber 4 bored on a side opposing the electro-magnetic operating section 21. Opened into the valve chamber 4 is a valve seat 5 which is provided in a passage intercommunicating the inlet and outlet ports 2 and 3. Opened on the other side surface of the valve casing 1, which is opposite to the surface provided with the inlet and outlet ports 2 and 3, is a manual operating button receptacle hole 6 which is in communication with the valve chamber 4 at the inner end thereof. As clear also from FIG. 4, the two side surfaces of the valve casing 1 are provided with a pair of locking projections 7 on the opposite sides of the outlet port 3 and receptacle hole 6, respectively, each locking projection 7 having an inclined surface 7a lowering toward the electromagnetic section 21. Hermetically fitted in the receptacle hole 6 is a manual operating button 8 which is provided with a groove 8a on its outer surface for receiving a turning tool and a cam 8b on its inner end face for abutting engagement with a plunger, which will be described hereinlater. An O-ring is fitted on the circumference of the manual operating button 8 to provide a hermetical seal therearound.

Mounting holes 9 are formed through the valve casing 1 between the above-mentioned two side surfaces for mounting the valve at a required position on a support structure. The side surfaces are provided with stepped portions 10 at the ends which meet the electromagnetic operating section, to receive a magnetic frame which serves as an outer shell member as will be described hereinlater.

On the other hand, the electromagnetic operating section 21 includes a bobbin 23 which is wound an electromagnetic coil 22. A stationary iron core 26 is fixedly mounted at one end of the axial center hole of the bobbin 23 which slidably receives a movable iron core or plunger 26. Upon energization of the electromagnetic coil 22, the plunger 26 is attracted to the stationary iron core 24 against the action of a spring 25. A valve member 27 which opens and closes the valve seat 5 is fixed at the fore end of the plunger 26. The bobbin 23 and electromagnetic coil 22 are enclosed in a magnetic plate 28 and a magnetic frame 29 substantially of U-shape in section which constitutes an outer shell. The magnetic operating section of the above-described construction may be encased in a molded synthetic resin.

The side walls of the magnetic frame 29 are provided with extensions which are extended toward the valve casing 1 over the position of the magnetic plate 28 and each have an notched center portion 30. Locking windows 31 are formed in the extensions on the opposite sides of the respective notched center portions 30.

A packing groove 11 is formed around the inlet and outlet ports 2 and 3 of the valve casing 1 and partly in the notched portions 30 of the magnetic frame 29. A packing 12 with a couple of holes, which circumvent the ports 2 and 3, is fitted in the packing groove 11.

In the foregoing embodiment, the valve casing 1 and the electromagnetic operating section 21 are joined by pressing them toward each other after mounting the magnetic frame 29 of the electromagnetic operating section 21 on the valve casing 1. By so doing, the narrow tab portions with the locking windows 31 on the opposite sides of the notched portions 30 of the magnetic frame 29 are easily deformed along the inclined surface 7a by elastic deformation as shown particularly in FIG. 4, and the locking windows 31 are fitted on the locking projections 7, thereby securely connecting the magnetic frame 29 to the valve casing 1. In this connected state, the notched portions 30 are positioned clear of the respective ports and manual operating button 8, precluding interference of the extensions of the magnetic frame 29 with the packing 12 and manual operating button 8 around the ports.

Further, since the valve casing 1 is provided with stepped portions 10 at the ends of its side surfaces as described hereinbefore, the respective side surfaces of the magnetic frame 29 are maintained substantially flush with the opposing surfaces of the valve casing 1.

Figure 5:
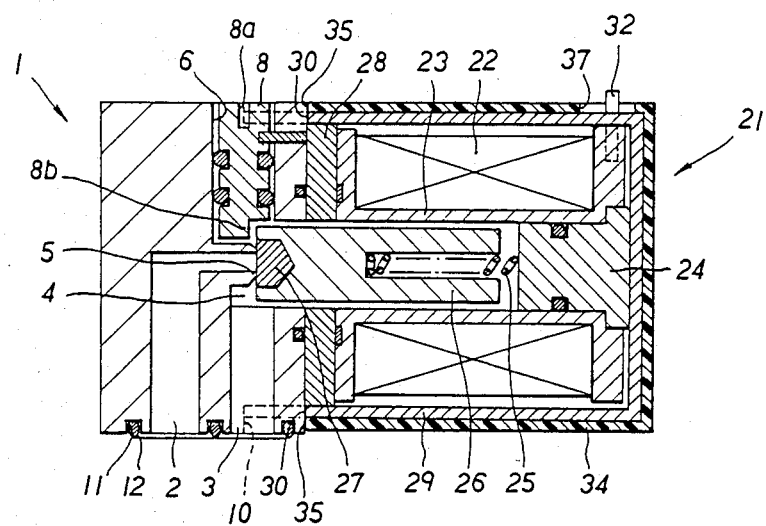
FIG. 5 is a view similar to FIG. 1 but showing another embodiment of the invention.
Figure 6:
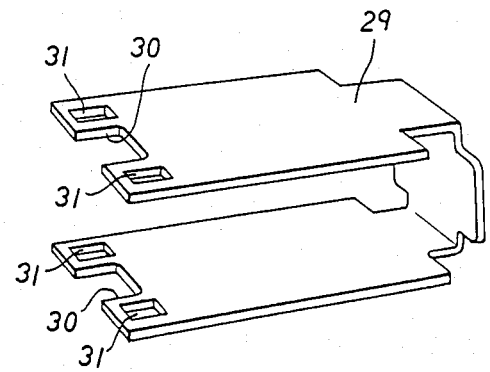
FIG. 6 is a perspective view of a magnetic frame.
Figure 7:
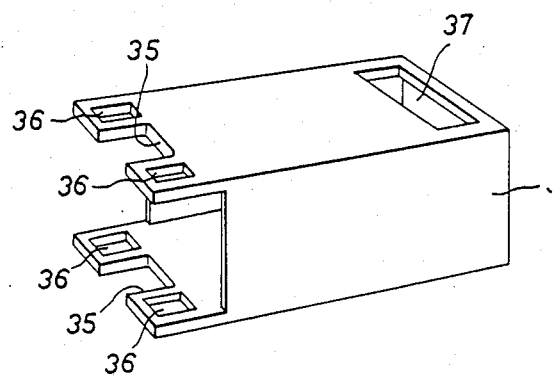
FIGS. 7 and 8 are perspective views of a protective cover.
Figure 8:
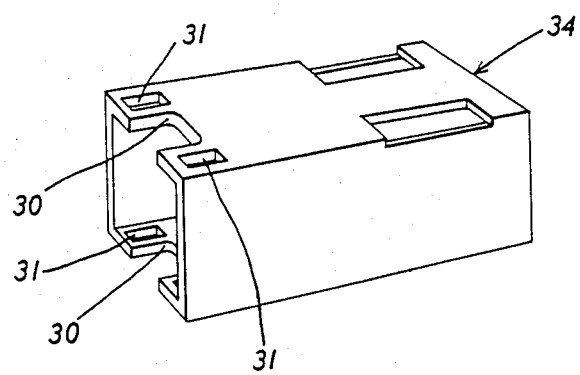

FIG. 5 shows another embodiment of the electromagnetic valve according to the invention, which is substantially same as the foregoing embodiment in construction except that the outer casing of the magnetic operating section 21 is constituted by a magnetic frame 29 and a protective cover 34 of a synthetic resin material which covers the magnetic frame 29. Similarly to the magnetic frame 29, the protective cover 34 is provided with extensions with notched portions 35 and a pair of locking windows 36 at the inner ends of its opposite side surfaces. A lead wire hole 37 is opened in one side wall of the protective cover 34 to pass therethrough lead wires 32 which supply power to the electromagnetic coil 22, and, though not shown in the drawing, a protective bush of rubber plastics or other flexible material may be fitted around the marginal edge of the lead wire hole 37. In this instance, the magnetic frame and protective cover may be shaped as shown in FIG. 6 and FIGS. 7 or 8.

In this embodiment, the valve casing 1 and electromagnetic section 21 are joined by pressing toward each other after mounting the magnetic frame 29 of the electromagnetic section 21 and the protective cover 34 of the electromagnetic section 21 on the valve casing 1. As a result, the magnetic frame 29 and protective cover 34 are easily deformed along the inclined surfaces 7a by elastic deformation since their widths are narrowed at the locking windows 31 and 36 on the opposite sides of the notched portions 30 and 35, and the locking windows 31 and 36 are engaged with the locking projections 7 to connect the electromagnetic section 21 to the valve casing 1. In this connected state, the notched portions 30 and 35 are positioned clear of the ports and the manual operating button 8 to preclude interference of the extensions of the magnetic frame 29 and protective cover 34 with the packing 12 and manual operating button 8 around the ports in the same manner as described hereinbefore. In this case, the respective sides of the protective cover 34 are maintained substantially flush with the meeting side surfaces of the valve casing 1 by the provision of the stepped portions 10 provided at the meeting ends of the side surfaces of the valve casing.

As the electromagnetic operating section is covered in the protective cover in the above-described manner, there is little possibility of the electromagnetic section being damaged by external forces during transportation of the valve or installation work. In addition, the valve casing and electromagnetic section are connected rigidly to each other through the eight locking windows which are provided on the magnetic frame and the protective cover.

Figure 9:
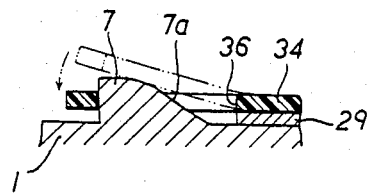
FIG. 9 is an enlarged fragmentary sectional view of a locking mechanism in the embodiment of FIG. 5.

The notched portions 30 and locking windows 31 which are also provided in the extension of the magnetic frame 29 in the foregoing embodiment may be omitted if desired, connecting the valve casing 1 and the electro-magnetic operating section 21 only by the engagement of the locking projections 7 with the locking windows 36 of the protective cover 33 (FIG. 9). In this case, the protective cover may be formed integrally with the magnetic frame by plastic molding, for the purpose of simplifying the assembling work of the electromagnetic valve.

In the event the valve seat 5 of the foregoing embodiments is closed by the valve member 27 due to suspension of power supply or other accidents, the manual operating button 8 can be turned by putting a driver or a similar tool in the groove 8a and turning same. Whereupon, the plunger 26 is slided toward the stationary iron core 24 against the action of the spring 25 by the cam 8b of the manual operating button 8, opening the valve seat 5. The provision of the manual operating button is not essential in the present invention, and, in such a case, there is no need for forming an notched portion in the outer shell of the electromagnetic section in such a manner to evade the manual operating button.

The valve casing 1 which has the electromagnetic operating section securely connected thereto is mounted on a desired machine or the like by the use of the mounting holes 8 and 9. Since the ports 2 and 3 are provided on one side surface of the valve casing 1 in the foregoing embodiments, it is easy to connect them with ports which are formed on the part of the machine. On the other hand, the manual operating button 8 is provided on the opposite side surface, so that it can be handled without troubles after mounting the valve casing 1 in position.

Although the foregoing embodiments show 2-port valves, it is to be understood that the present invention can be applied to various valves other than 2-port valves.

What is claimed is:

1. An electromagnetic valve assembly of the type formed by connecting a valve casing and an electromagnetic operating section which are fabricated separately, said valve assembly comprising:
   an inlet port and an outlet port provided on one side surface of said valve casing;
   locking projections provided on the said surface and the opposite side surface of the said valve casing;
   a plate-formed magnetic frame of said electromagnetic section, having a notched portion at one side surface displaced from said inlet and outlet ports and having locking windows on the both sides of said notched portion and on the other side surface so as the locations of these locking windows correspond to said locking projections, said locking windows being elastically engageable with said locking projections on said valve casing to connect said electromagnetic section thereto.

2. The electromagnetic valve assembly of claim 1, wherein said valve casing is provided with a manual operating button on the side surface opposite to the surface with said inlet and outlet ports, and said magnetic frame of said electromagnetic section is provided with a notched portion at said other side surface displaced from said manual operating button.

3. The electromagnetic valve assembly according to either claims 1 or 2, wherein said magnetic frame is enclosed in a protective cover having a notched portion and locking windows corresponding to the notched portion and locking windows on said magnetic frame, and the valve casing and the electromagnetic operating section are coupled together by engaging said locking projections with the locking windows on the magnetic frame and on the protective cover.

4. The electromagnetic valve assembly according to claim 3, wherein said protective cover is formed integrally with said magnetic frame by plastic molding.

5. The electromagnetic valve assembly of claim 4, wherein said protective cover alone is provided with said notched portions and locking windows, and said magnetic operating section is connected to said valve casing by engaging said locking windows of said protective cover with said locking projections on said valve casing.

6. The electromagnetic valve assembly of claim 4, wherein said protective cover is formed integrally with said magnetic frame by plastic molding.

7. The electromagnetic valve assembly of claim 5, wherein said protective cover is formed integrally with said magnetic frame by plastic molding.

8. The electromagnetic valve assembly of claim 2, wherein said outer shell member is constituted by a magnetic frame and a protective cover fitted on said magnetic cover.

* * * * *